UNITED STATES PATENT OFFICE.

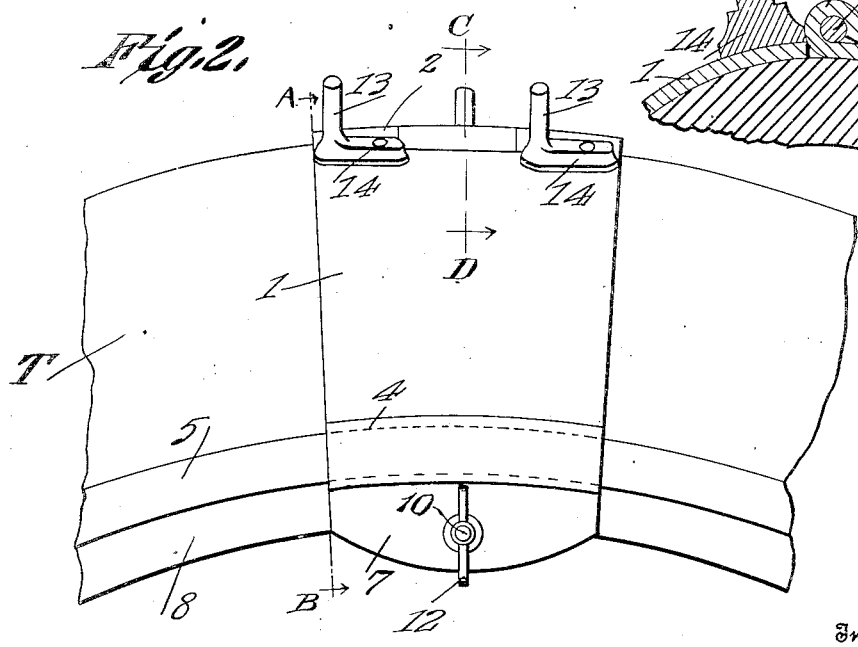

ROSS SMITH, OF TERRELL, TEXAS.

ANTISKID DEVICE.

1,331,391.　　　　　Specification of Letters Patent.　　Patented Feb. 17, 1920.

Application filed April 18, 1917. Serial No. 162,940.

*To all whom it may concern:*

Be it known that I, Ross Smith, a citizen of the United States, residing at Terrell, in the county of Kaufman and State of Texas, have invented a new and useful Antiskid Device, of which the following is a specification.

In an armor of this type the plates are required to bear the whole weight on the tire and are subjected to greater strain than are loosely connected or resilient plates. This strain occurs particularly at the hinge joint between the two tread edges, which lies in the center of the ground engaging surface of the armor. It is therefore the object of the invention to provide an armor of the type above described having suitable reinforcing means for the hinge. This is accomplished by providing the tread edges of the armor plates with long road engaging studs having large heavy foot plates which brace the hinge knuckles on both sides, while the unusually long double row of studs tends to keep the hinge from the road surface and relieve it from weight as far as possible.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:

Figure 1 is a sectional view on the line A—B of Fig. 2.

Fig. 2 is a side view of the same as above described;

Fig. 3 is a fragmental section taken on the line C—D of Fig. 2.

The tire armor here shown is composed of two opposed plates 1 having their tread edges turned over to form coöperating hinge knuckles 2 which, receiving a pin 3, form a hinge.

The plates 1 are arched to conform closely to the tread surface and sides of the tire T and then merge into channels A which tightly engage the flanges 5 of the clencher rim 6. The plates are continued, forming flanges 7 which grip the wooden felly 8 and are provided with holes 9 through which passes a bolt 10. The large head 11 of bolt 10 engages the flange 7 on one side, while on the other the flange 7 is engaged by a wing nut 12 operating on the screw threads of the bolt 10, thereby forming an adjustable means for clamping the flanges 7 of the armor plates 1 against the felly 8.

The armor plates 1 are provided with long outwardly extending studs 13 having large, heavy and substantially rectangularly shaped base plates 14. The inner edges of the base plates 14 bear against the hinge knuckles 2, thereby forming effective reinforcements for the hinge, as shown in Fig. 3.

In removing the armor, the wing nut 12 is unscrewed, the bolt 10 removed, and the plates 1 may then be swung outwardly away from the tire T on the hinge. The application of the armor is accomplished by reversing the operation above described.

It is apparent from the foregoing description that the application and removal of the armor may be readily accomplished without the use of tools and also that the armor when applied protects the tire and insures against slipping and skidding. Any number of these armored protectors may be used on a tire, but it is thought that under reasonable conditions six of them spaced around the circumference of the wheel will be sufficient.

Having thus described my invention, what I claim as new is:

A device of the class described comprising oppositely disposed tire engaging members provided in their tread portions with curved coöperating free-ended parts which form knuckles; a pivot pin passing through the knuckles and coacting therewith to fashion a hinge; and foot plates secured to said members, the foot plate of each member bearing against the end of the knuckle-forming part of the other member to prevent said parts from opening with respect to the pin, the foot plates being provided with outwardly projecting ground-engaging studs; and felly-engaging means connecting the tire engaging members.

In testimony that I claim the foregoing as my own, I have hereto affixed my signature in the presence of two witnesses.

ROSS SMITH.

Witnesses:
C. C. Jordan,
C. H. Brown.